United States Patent [19]
Ohta et al.

[11] Patent Number: 5,095,459
[45] Date of Patent: Mar. 10, 1992

[54] OPTICAL NEURAL NETWORK

[75] Inventors: Jun Ohta; Kazuo Kyuma; Shuichi Tai; Masaya Oita, all of Amagasaki, Japan

[73] Assignee: Mitsubishi Denki Kabushiki Kaisha, Tokyo, Japan

[21] Appl. No.: 375,813

[22] Filed: Jul. 5, 1989

[30] Foreign Application Priority Data

| Jul. 5, 1988 | [JP] | Japan | 63-167321 |
| Jul. 12, 1988 | [JP] | Japan | 63-174033 |
| Aug. 8, 1988 | [JP] | Japan | 63-197547 |
| Feb. 28, 1989 | [JP] | Japan | 1-046789 |

[51] Int. Cl.$^5$ .............. G09C 15/00; G06G 7/00; G06E 3/00
[52] U.S. Cl. ............... 395/25; 364/822; 364/807
[58] Field of Search ........... 364/807, 822, 837, 841, 364/842, 845, 513; 382/11, 12; 350/96.11–96.14, 162.12–162.15

[56] References Cited

U.S. PATENT DOCUMENTS

| 4,567,569 | 1/1986 | Caulfield et al. | 364/841 |
| 4,633,428 | 12/1986 | Byron | 364/845 |
| 4,704,702 | 11/1987 | Groutzoulis | 364/841 |
| 4,862,406 | 8/1989 | Fisher | 364/807 |

FOREIGN PATENT DOCUMENTS

| 0294116 | 12/1988 | European Pat. Off. |
| 1202551 | 8/1970 | United Kingdom |
| 2144848 | 3/1985 | United Kingdom |
| 2154772 | 9/1985 | United Kingdom |
| 2193020 | 1/1988 | United Kingdom |

OTHER PUBLICATIONS

Author-Nabil H. Farhat, Demetris Psaltis, Aluizio Prata and Eung Paek, "Optical Implementation of the Hopfield Model", 1985, vol. 24, p. 1469.

Author-Ju-Seog Jang et al., "Optical Implementation of the Hopfield Model for Two-Dimensional Associative Memory", Mar. 1988, vol. 13, No. 3.

Anthony M. Tai, "Low-Cost LCD Spatial Light Modulator with High Optical Quality", 5/1/86, Applied Optics No. 9, vol. 25.

"The Institute of Electronics, Information and Communication Engineers Technical Research Report", vol. 87, No. 385, Date: Feb. 23, 1988.

Author-J. J. Hopfield, "Neural Networks and Physical Systems with Emergent Collective Computational Abilities," 1982, vol. 79, pp. 2554–2558.

Author-Demetri Psaltis and Nabil Farhat, "Optical Information Processing Based on an Associative-Memory Model of Neural Nets and Feedback with Thresholding", vol. 10, 1985, No. 2.

*Primary Examiner*—Jerry Smith
*Assistant Examiner*—Jim Trammell
*Attorney, Agent, or Firm*—Wolf, Greenfield & Sacks

[57] ABSTRACT

An optical neural network which imitates a biological neural network, to provide an associative and/or pattern recognition function, is made of light emitting elements to represent an input neuron state vector, a correlation matrix which modulates light according to stored vector information, light receiving elements, an accumulator and a comparator to perform a threshold function. A stored vector closest to an input vector can be found from a large amount of information without increasing the system size by dividing the correlation matrix and the input neuron state vector with time division techniques, frequency modulation or phase modulation techniques. Positive and negative valves can also be provided with similar techniques.

14 Claims, 9 Drawing Sheets

FIG. 2

| TIME | 1 | 2 | ... | P | P+1 | P+2 | P+3 |
|---|---|---|---|---|---|---|---|
| LIGHT EMITTING ARRAY | V(1) | V(2) | ... | V(P) | — | V(1) | V(2) |
| MATRIX PLANE | T(1,1) | T(2,1) | ... | T(P,1) | — | T(1,2) | T(2,2) |
| LIGHT RECEIVING ARRAY | T(1,1) V(1) | T(2,1) V(2) | ... | T(P,1) V(P) | — | T(1,2) V(1) | T(2,2) V(2) |
| ACCUMULATOR | T(1,1) V(1) | T(1,1) V(1) + T(2,1) V(2) | ... | $\sum_{\ell=1}^{P} T(\ell,1) V(\ell)$ | — | T(1,2) V(1) | T(1,2) V(1) + T(2,2) V(2) |
| COMPARATOR OUTPUT | — | — | ... | — | V(1) | — | — |

| TIME | 2P+1 | 2P+2 | ... | N(=P²) | N+1 | ... | N+P-1 | N+P |
|---|---|---|---|---|---|---|---|---|
| LIGHT EMITTING ARRAY | V(P) | — | ... | V(1) | V(2) | ... | V(P) | — |
| MATRIX PLANE | T(P,2) | — | ... | T(1,P) | T(2,P) | ... | T(P,P) | — |
| LIGHT RECEIVING ARRAY | T(P,2) V(P) | — | ... | T(1,P) V(1) | T(2,P) V(2) | ... | T(P,P) V(P) | — |
| ACCUMULATOR | $\sum_{\ell=1}^{P} T(\ell,2) V(\ell)$ | — | ... | T(1,P) V(1) | T(1,P) V(1) + T(2,P) V(2) | ... | $\sum_{\ell=1}^{P} T(\ell,P) V(\ell)$ | — |
| COMPARATOR OUTPUT | — | V(2) | ... | — | — | ... | — | V(P) |

RETURN TO ↑

OPTICAL NEURAL NETWORK

BACKGROUND OF THE INVENTION

This invention relates to neurocomputers which imitate a biological neural network to provide an associative and/or pattern recognition function.

A conventional optical neurocomputer such as described in *Applied Optics*, 1985, Vol. 24, No. 10, p. 1469, is shown in FIG. 8. This optical neurocomputer includes an array of light emitting elements 1, a correlation matrix mask 2 for performing optical modulation, an array of light receiving elements 3 for receiving optical signals, and a threshold element 5 for comparing the output of the light receiving array 3 with the threshold value.

A conventional image processing optical neurocomputer such as described in *Optics Letters*, 1988, Vol. 13, No. 3, pp. 248-250, is shown in FIG. 9. This image processing optical neurocomputer includes a spatial light modulator 101 to which uniform incident light rays 107 are applied, a hologram 102 having a correlation matrix, a light receiving array 106, and a comparator 5.

The operation of the above neurocomputers is based on the neural network model proposed by Hopfield in, for example, *Proceedings of National Academy of Science*, U.S.A., 1982, Vol. 79, pp. 2554-2558. According to this model it is possible to make an associative memory for selecting information closest to an input vector $S_i^{(mo)}$ from M pieces of N-dimensional vector information $S_i^{(m)}$, wherein $i=1, 2, \ldots, N$, $m=1, 2, \ldots M$, and $S_i^{(m)} \in \{1, -1\}^N$ for $\forall m$, which have been stored in advance.

The stored information is given by the correlation matrix 2 of FIG. 8 or hologram 102 of FIG. 9. The correlation matrix $T_{ij}$ is given by $$T_{ij} = \sum_{m=1}^{M} S_i^{(m)} S_j^{(m)} \quad (i \neq j), \quad T_{ij} = 0 \tag{1}$$

For simplification, it is assumed that there is little correlation between the stored information vectors. In other words, the stored information vectors are orthogonal each other. That is to say, $$\frac{1}{N} \sum_i S_i^{(m)} S_i^{(m')} = \delta_{mm'} \delta_{mm'} = \begin{cases} 1 (m = m') \\ 0 (m \neq m') \end{cases} \tag{2}$$

If $S_i^{(mo)}$ is an incomplete input vector close to $S_i^{(m)}$, the product of $S_i^{(mo)}$ and the correlation matrix is given by $$\sum_j T_{ij} S_j^{(mo)} \approx S_i^{(m)} + O(\sqrt{M/N}) \tag{3}$$

wherein $O(x)$ is the increment of x order. Thus, it is possible to output the stored information vector closest to the input vector by subjecting the output $T_{ij}S_i^{(mo)}$ to a highly non-linear operation and feeding the result back to the input.

In FIG. 8, the neuron states are represented by ON/OFF of the light emitting elements 1 by using the threshold element 5 as a non-linear operator and a unipolar vector as $$V_i = (S_i + 1)/2. \tag{4}$$

The product of the correlation matrix and the neuron state vector $$U_i = T_{ij} V_i \tag{5}$$

is represented by the output of the light receiving array 3. This product $U_i$ is subjected to a threshold process $$V_i = (U_i - U_{th}) \tag{6}$$

wherein (x) is 1 for $x > 0$ and 0 for $x \leq 0$, and the result $V_i$ is fed back to the input. The relationship between the number of pieces of stored information (M) and the number of neurons (N) is expressed by $$M \approx N/(4 \log N). \tag{7}$$

In FIG. 9, in order to handle 2-dimensional information such as picture information, the vector component of a neuron ($S_i$) is converted into a unipolar vector ($V_i$) as described above $$V_i = (S_i + 1)/2. \tag{4}$$

In order to convert the unipolar vector ($V_i$) to a matrix ($X_{kl}$) of L rows and L columns, a transformation ($\tau$) is performed $$X_{kl} = \tau[V_i] = \begin{pmatrix} V_1, V_2, \ldots, V_L \\ V_{L+1}, V_{L+2}, \ldots, V_{2L} \\ \vdots \\ V_{N-L+1}, \ldots, V_N \end{pmatrix} \tag{8}$$

wherein $N = L^2$. The states of neurons arranged in the form of a matrix ($X_{kl}$) are represented by ON/OFF of the spatial light modulator 101 to modulate the uniform incident light 107.

The correlation matrix ($T_{ij}$) performs transformation ($\tau$) for each component (j) of every column to provide N submatrices of L rows and L columns ($Y_{pq}^{(kl)}$). Namely, $$Y_{pq}^{(kl)} = \tau[T_{ij}] = \begin{pmatrix} T_{1j}, T_{2j}, \ldots, T_{Lj} \\ T_{L+1j}, T_{L+2j}, \ldots, T_{2Lj} \\ \vdots \\ T_{N-L+1j}, \ldots, T_{Nj} \end{pmatrix} \tag{9}$$

$(kl = 11, 12, \ldots 1L, 21, \ldots, LL)$

The sum of vector products of Eq. (3) becomes $$X_{pq} = \sum_{kl=11}^{LL} Y_{pq}^{(kl)} X_{kl} \tag{5'}$$

In FIG. 9, the correlation matrix ($Y_{pq}^{(kl)}$) is stored in the hologram 102. The incident light 107 from a portion ($X_{kl}$) of the spatial light modulator 101 strikes the corresponding submatrix $Y^{(kl)}$ of the hologram 102. The incident light is diffracted in different directions for each component $Y_{pq}^{(kl)}$ of the submatrix $Y^{(kl)}$. The receiving array 106 is placed at a focus of the diffracted light rays from the entire matrix to output a signal ($X_{pq}$). This signal $X_{pq}$ is subjected to a threshold process in the comparator 5 as a non-linear operator, and the result is fed back to the spatial light modulator 101 as an input signal Xkl.

$$Xpq = (Xpq - Xth) \quad (6')$$

wherein $(x) = 1$ if $x > 0$ and $0$ if $x \leq 0$.

A conventional optical associative neurocomputer such as described in *Electronic Information Communications Society of Japan, Opitical Quantum Electronics Study Group Papers OQE* 97-174, 1988 is shown in FIG. 10. This optical associative neurocomputer includes an input terminal 108 into which incomplete information is put, a pair of light emitting diode arrays 1a and 1b, a pair of optical masks 2a and 2b, a pair of light receiving arrays 3a and 3b, a differential amplifier array 4, a comparator array 5, and an output terminal 109 from which complete information is put out.

In operation, the LED arrays 1a and 1b apply fan-shaped light beams to the optical masks 2a and 2b. Each LED array 1a, 1b is turned on or off to represent a logic 1 or 0, thus representing a sort of vector $V = (V_1, V_2, \ldots V_n)$. Each optical mask 2a, 2b, which is divided into $(n \times n)$ elements, each having a different optical transmittance, represents a sort of matrix $T = [Tij]$. The receiving arrays 3a, 3b represent a sort of vector $U = (U_1, U_2, \ldots U_n)$. By irradiating the j-th row of the optical mask with the j-th LED and receiving the light from the i-th column of the optical mask with the i-th receiving element, it is possible to perform the following vector matrix operation:

$$Ui = \sum_{j=1}^{N} TijVj \quad (5)$$

In the neurocomputer, information is stored in joint between neurons. In this optical associative neurocomputer, information is stored in the transmittance (T) of an optical mask. The rule of this information storage based on the following Hopfield's model is given by $$Tij = \sum_{s} (2V_i^{(s)} - 1)(2V_j^{(s)} - 1) \quad (1')$$

Since it is impossible to handle negative values of Tij in optics, a pair of optical systems $(Ui^{(+)}, Ui^{(-)})$ are made corresponding to positive values $Tij^{(+)}$ and the negative values $Tij^{(-)}$. The difference between the two systems obtained from the differential amplifier 4 is $$Ui = Ui^{(+)} - Ui^{(-)}. \quad (10)$$

This output signal is subjected to a threshold process in the comparator 5 as follows $$Vi = \theta(Ui) \quad (6)$$

wherein $\theta(x) = 1$ if $x > 0$ and $0$ if $x \leq 0$. Then, the result is fed back to the LED arrays 1a, 1b.

By storing three pieces of information corresponding to alphabets A, J, and E, for example, in the optical masks 2a, 2b, if incomplete information A', for example, is put into the LED 1a, 1b, the output after repeated feedback is complete information A which is closest to the input information A'. In other words, the energy of the system takes the lowest value at the stored information A, J, and E; when incomplete information is given, the on/off states of an LED array change, which in turn changes the entire system so that the energy around the incomplete information takes the lowest value.

In order to increase the number of pieces of information (M) stored in the conventional neurocomputer, it is necessary to increase the number of neurons (N) according to Eq. (7). Consequently, the size of a LED array, receiving array, and/or correlation matrix becomes so large that the entire system becomes large. In addition, the increased number of neurons makes alignment of the optics difficult. Since a great number of light rays are diffracted by the hologram in the embodiment of FIG. 9, it is difficult to make such a hologram. In the embodiment of FIG. 10, two optical systems are required corresponding to positive and negative values of the Tij matrix, making the system complex.

SUMMARY OF THE INVENTION

Accordingly, it is an object of the invention to provide a neurocomputer which has the increased number of neurons without increasing the system size to thereby increase the number of pieces of stored information (M) and is easy to not only make but also align the optics.

It is another object of the invention to provide an optical neurocomputer with a single optical system capable of handling both positive and negative values.

In accordance with one aspect of the invention there is provided a neurocomputer for selecting vector information closest to an input vector from stored vector information by performing a production operation of a neuron state vector and a correlation matrix which gives the vector information, characterized by a control unit which divides the correlation matrix into a plurality of submatrices and outputs them in time sequence while output a plurality of partial vectors of the state vector in time sequence to perform an operation on each submatrix and each partial vector, thereby providing a production operation of the correlation matrix and the neuron state vector as a whole.

In accordance with another aspect of the invention there is provided a neurocomputer for selecting vector information closest to an input vector from stored vector information by performing a production operation of a neuron state vector and a correlation matrix which gives the vector information, characterized by a control section which modulates a plurality of submatrices of the correlation matrix and partial vectors of the state vector with different frequencies for frequency multiplexing, perform a production operation on the state vector and the correlation matrix under multiplexed conditions, followed by frequency separation, to thereby provide a product of the state vector and the correlation matrix as a whole.

In accordance with still another aspect of the invention there is provided a neurocomputer for performing a product and sum operation of a neuron state vector and a correlation matrix, which includes an array of light emitting elements which are turned on or off according to the neuron state vector; a spatial light modulator for modulating light from the array of light emitting elements to transmit product optical signals of the neuron state vector and the correlation matrix; a unit for driving the spatial light modulator with different frequencies or phases for positive and negative values of stored information or by alternating time division multiplexing to realize the correlation matrix; an array of light receiving elements for receiving the product optical signal from the spatial light modulator to provide a sum of the product optical signals; a signal processor for discriminating an output of the array of light receiving elements to provide signals equivalent to the positive and negative values; a differential amplifier for providing a difference between signals equivalent to the positive and negative values; and a comparator for subjecting a value of the difference from the differential amplifier to a threshold process to provide a feedback to the array of light emitting elements.

In accordance with yet another aspect of the invention there is provided a neurocomputer for performing a product and sum operation of a neuron state vector and a correlation matrix, which includes a state vector transmitter consisting of a matrix of elements which generates a signal corresponding to the neuron state vector; a correlation matrix unit for dividing the correlation matrix into a plurality of submatrices and outputting them in time sequence while modulating a signal of the state vector transmitter in submatrix state to provide a group of product signals of the neuron state vector and the submatrix; and a receiving element for receiving the group of product signals to provide a sum thereof, whereby the product and sum operation is performed in time sequence.

The above and other objects, features, and advantages of the invention will become more apparent from the following description when taken in conjunction with the accompanying drawings.

BRIEF DESCRIPTION OF THE DRAWINGS

FIG. 2 is a table showing the operational flow of the neurocomputer of FIG. 1 with respect to the time;

DESCRIPTION OF THE PREFERRED EMBODIMENT

Figure 1:
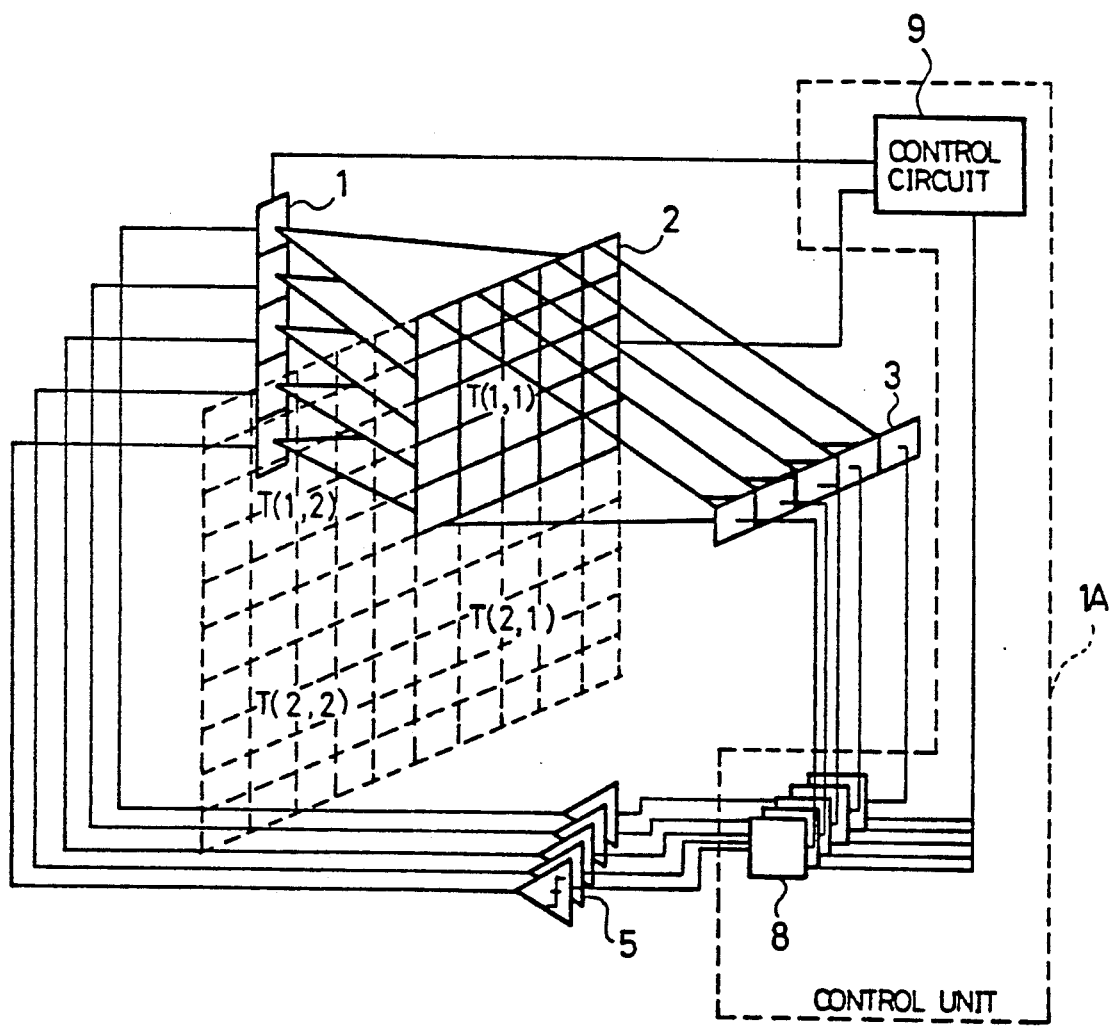
FIG. 1 is a schematic diagram of a neurocomputer according to an embodiment of the invention.
Figure 8:
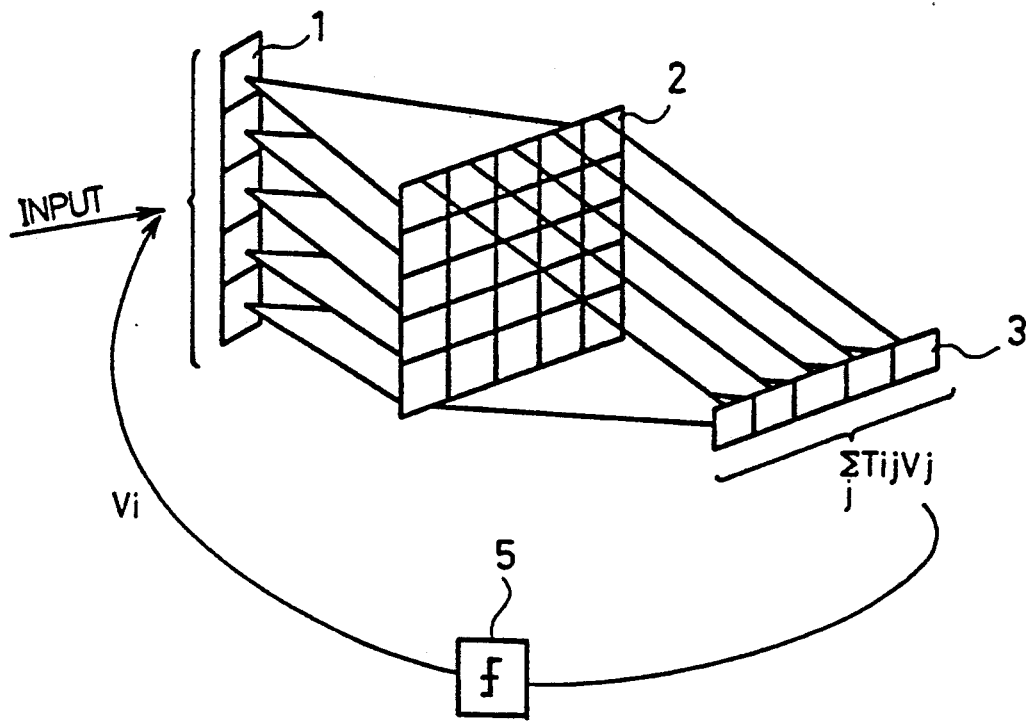
FIGS. 8, 9, and 10 are schematic diagrams of conventional neurocomputers, respectively.
Figure 9:
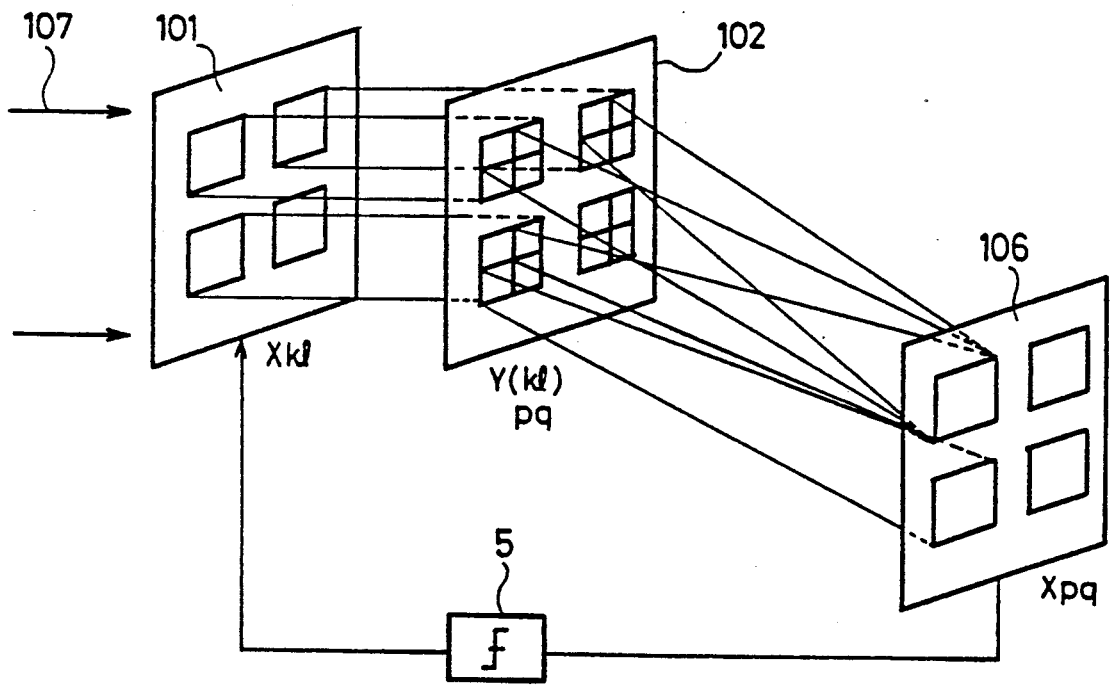

In FIG. 1, like reference numerals designate like or corresponding parts of FIG. 8. This neurocomputer includes an accumulator 8 made from a capacitor integration circuit and a control circuit 9 for controlling the light emitting array 1, the correlation matrix mask 2, and the accumulator 8. The accumulator 8 and the control circuit 9 constitute a control unit 1A.

In operation, let N be the number of imaginary neurons, P the number of actually displayed neurons (light emitting/receiving elements), V/ the neuron state vector, and U| the product of the correlation matrix T and the neuron state vector V/ (membrane potential), then $$V/ = \begin{bmatrix} V/(1) \\ V/(2) \\ \vdots \\ V/(P) \end{bmatrix}, U| = \begin{bmatrix} U|(1) \\ U|(2) \\ \vdots \\ U|(P) \end{bmatrix} \qquad (11)$$

$$T = \begin{bmatrix} T(1,1) & T(1,2) & \cdots & T(1,P) \\ T(2,1) & & & \vdots \\ \vdots & & & \vdots \\ T(P,1) & & & T(P,P) \end{bmatrix} \qquad (12)$$

$$\begin{bmatrix} U|(1) \\ \vdots \\ U|(P) \end{bmatrix} = \begin{bmatrix} \sum_{l=1}^{P} T(1,l)V/(l) \\ \vdots \\ \sum_{l=1}^{P} T(P,l)V/(l) \end{bmatrix} \qquad (13)$$

In the embodiment of FIG. 1, P=2.

Now, a partial correlation matrix T(1, 1) is set in the correlation matrix mask 2 at a time t=1 by means of the control circuit 9 to display a partial state vector V/ (1) on the light emitting array 1. The result of matrix vector operation T(1, 1) V/ (1) is output from the light receiving array 3 and stored in the accumulator 8.

At a time t=2 (=P), a partial correlation matrix T(2, 1) is set in the correlation matrix mask 2 to display a partial vector V/ (2) on the light emitting array 1. The light receiving array 3 performs a matrix vector operation T(2, 1) V/ (2), and the accumulator 8 stores the result:

$$U|(1) = T(1, 1) \ V/(1) + T(2, 1) \ V/(2) \qquad (14)$$

At a time t=3, the control circuit 9 subjects the output from the accumulator 8 to a threshold process in the threshold element 5

$$V/(1) = \theta(U|(1)) \qquad (15)$$

The process result is input to the light emitting array 1.

At a time t=4, a partial correlation matrix T(1, 2) and a partial vector V/ (1) are displayed.

At a time t=5, a partial correlation matrix T(2, 2) and a partial vector V/ (2) are displayed so that the accumulator 8 stores the following:

$$U|(2) = T(1, 2) \ V/(1) + T(2, 2) \ V/(2) \qquad (16)$$

At a time $t=6$ (=2P+2), the output of the accumulator 8 is subjected to a threshold process $$V/(2) = \theta(U|(2)) \qquad (17)$$

The result is fed back to the light emitting array 1. The above process is repeated until the output of the threshold element 5 stops changing. In this way, the same operation as that of the number of imaginary neurons (N) is obtained. This operational flow is shown in FIG. 2.

The partial correlation matrix may be expressed by representing each matrix element with the transmittance of a correlation matrix mask 2 or a spacial light modulator, such as a liquid crystal panel, the transmittance of which is externally controllable.

Figure 3:
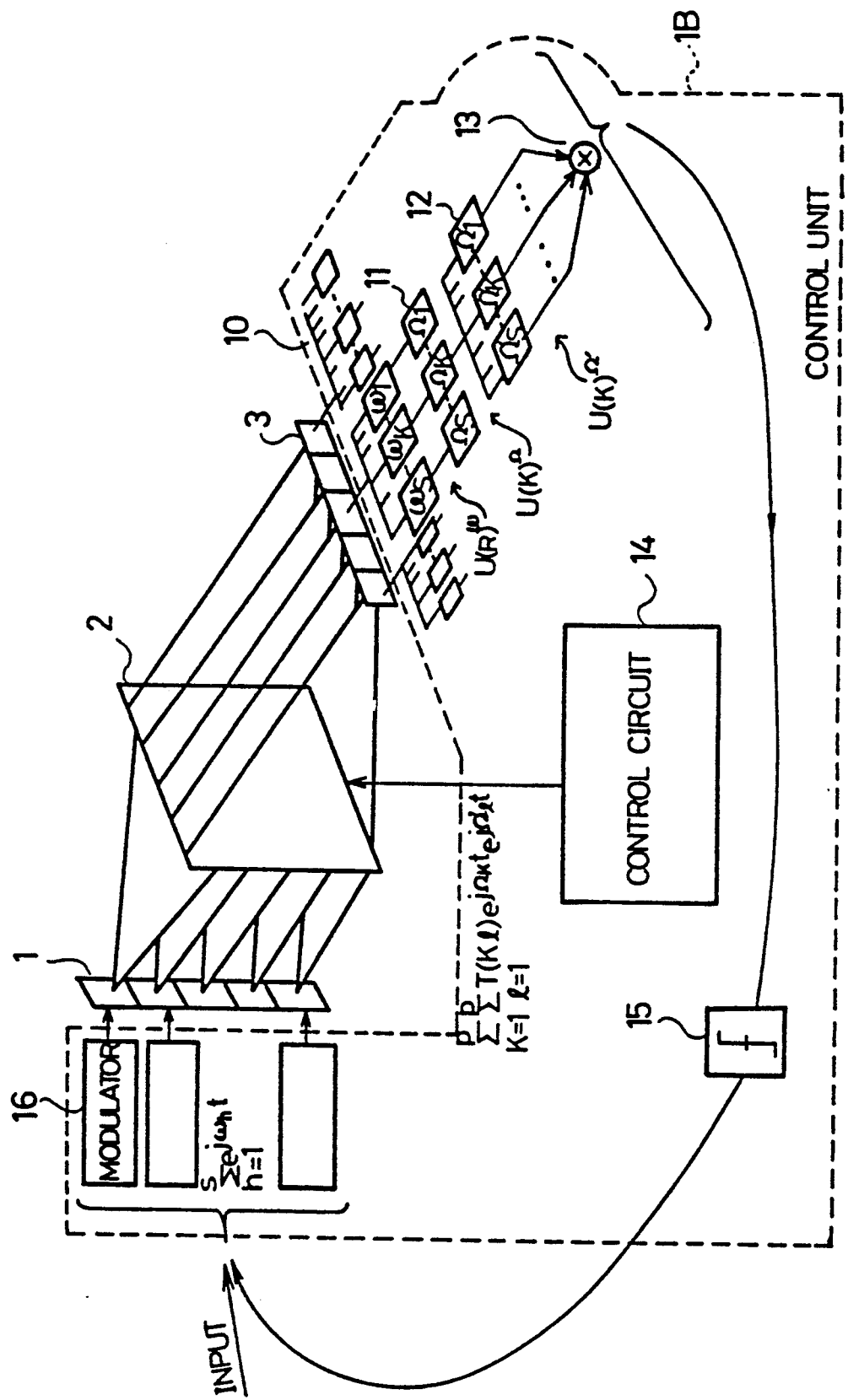
FIG. 3 is a schematic diagram of a neurocomputer according to another embodiment of the invention.

In FIG. 3, like reference numerals designate like or corresponding parts of FIG. 1. This neurocomputer includes FM demodulators 10, 11, 12 for demodulating the output of the light receiving array 3, an adder 13 for adding the outputs of the FM demodulator 12, a control circuit 14 for controlling the correlation matrix mask 2, a comparator 15 for comparing the output of the adder 13 with the threshold value, and modulators 16 for applying modulated energy to the light emitting array 1. The FM demodulators 10-12, the adder 12, the control circuit 14, the comparator 15, and the modulator 16 constitute a control unit 1B.

In operation, let N be the number of neurons, P the number of actually displayed neurons (light emitting-/receiving elements), and S the number of divisions, wherein $N = S \times P$. Each component of the neuron state vector $V/$ at the light emitting array 1 is modulated with a angular frequency $\omega_h$ in the modulator 16 for multiplexing simultaneous transmission. That is, $$V/ = \begin{bmatrix} \sum_{h=1}^{S} V(1)_h e^{j\omega_h t} \\ \vdots \\ \sum_{h=1}^{S} V(P)_h e^{j\omega_h t} \end{bmatrix} \quad (18)$$

The correlation matrix T in the correlation matrix mask 2 is divided into $(S \times S)$ submatrices by the control circuit 14. The respective components of each submatrix are modulated with angular frequencies $\Omega_k$, $\Omega'_l$ for simultaneous transmission. That is, $$T = \qquad (19)$$

$$\begin{bmatrix} \sum_{k=1}^{S}\sum_{l=1}^{S} T(1,1)_{kl} e^{j\Omega_k t} e^{j\Omega'_l t} & \cdots & \sum_{k=1}^{S}\sum_{l=1}^{S} T(1,P)_{kl} e^{j\Omega_k t} e^{j\Omega'_l t} \\ \vdots & & \vdots \\ \sum_{k=1}^{S}\sum_{l=1}^{S} T(P,1)_{kl} e^{j\Omega_k t} e^{j\Omega'_l t} & \cdots & \sum_{k=1}^{S}\sum_{l=1}^{S} T(P,P)_{kl} e^{j\Omega_k t} e^{j\Omega'_l t} \end{bmatrix}$$

The product $U|$ of the neuron state vector $V/$ and the correlation matrix T is given by $$U| = \begin{bmatrix} U(1) \\ \vdots \\ U(p) \end{bmatrix} = \qquad (20)$$

$$\begin{bmatrix} \sum_{h=1}^{S}\sum_{k=1}^{S}\sum_{l=1}^{S}\sum_{q=1}^{P} V(q)_h T(1,q)_{kl} e^{j\omega_h t} e^{j\Omega_k t} e^{j\Omega'_l t} \\ \vdots \\ \sum_{h=1}^{S}\sum_{k=1}^{S}\sum_{l=1}^{S}\sum_{q=1}^{P} V(q)_h T(1,q)_{kl} e^{j\omega_h t} e^{j\Omega_k t} e^{j\Omega'_l t} \end{bmatrix}$$

wherein

First of all, the output of the first light receiving element U(1) is considered. The signals $U(1)_1^\omega, \ldots U(1)_s^\omega$ after U(1) is passed through the FM demodulators 10 having a central angular frequency of $\omega_1, \ldots, \omega_s$ are given by $$U(1)_1^\omega = \sum_{k=1}^{S}\sum_{l=1}^{S}\sum_{q=1}^{P} V(q)_1 T(1,q) e^{j\Omega_k t} e^{j\Omega'_l t} \qquad (21)$$

$$U(1)_s^\omega = \sum_{k=1}^{S}\sum_{l=1}^{S}\sum_{q=1}^{P} V(q)_s T(1,q) e^{j\Omega_k t} e^{j\Omega'_l t} \qquad (22)$$

Then, $U(1)_1^\omega, \ldots U(1)_s^\omega$ are passed through the FM demodulators 11 having a central angular frequency of $\Omega_1, \ldots \Omega_s$ to provide $U(1)_1^\Omega, \ldots U(1)_s^\Omega$ as follows.

$$U(1)_l^\Omega = \sum_{l=1}^{S}\sum_{q=1}^{P} V(q)_l T(1,q)_l e^{j\Omega'_l t} \qquad (23)$$

$$U(1)_s^\Omega = \sum_{l=1}^{S}\sum_{q=1}^{P} V(q)_s T(1,q)_l e^{j\Omega'_l t} \qquad (24)$$

Then, $U(1)_1^\Omega, \ldots U(1)_s^\Omega$ are passed through the FM demodulators 12 having a central angular frequency $\Omega'_1, \ldots \Omega'_s$ to provide outputs $U(1)_1^{\Omega'}, \ldots U(1)_s^{\Omega'}$ as $$U(1)_l^{\Omega'} = \begin{cases} \sum_{q=1}^{P} V(q)_1 T(1,q)_{11} \\ \vdots \\ \sum_{q=1}^{P} V(q)_1 T(1,q)_{1s} \end{cases} \qquad (25)$$

$$U(1)_s^{\Omega'} = \begin{cases} \sum_{q=1}^{P} V(q)_s T(1,q)_{11} \\ \vdots \\ \sum_{q=1}^{P} V(q)_s T(1,q)_{1s} \end{cases} \qquad (26)$$

$U(1)_1^{\Omega'}, \ldots U(1)_s^{\Omega'}$ are added by the adder 13 to provide a signal $$U(1) = \sum_{f=1}^{S}\sum_{g=1}^{S}\sum_{q=1}^{P} V(q)_f T(1,q)_{1g} \qquad (27)$$

This signal is subjected to a threshold process in the comparator 15, and the result is fed back to the input V(1) of the first light emitting element.

By repeating the above operation for $U(2), \ldots U(P)$, it is possible to provide the same operation as that of the N neurons.

Although the next partial matrix is displayed with timing faster than the response time of the light receiving array 3 in the above embodiment, an integrator may be provided behind the light receiving array to perform an operation $\Sigma T(q,1) \, V(q)$ wherein q is $1, \ldots P$. Also, a memory and an adder may be provided. Although the vector matrix operation is performed by the optical crossbar method, another method, such as a systolic operation method, may be used.

Although the invention is applied to the association characteristics in the above embodiment, it may be applied to optimal value problems, too. It may also incorporate a learning function to produce substantially the same results as those of the above embodiment. Although Hopfield's neural network model is used in the above embodiment, another neural network model, such as a back propagation model, may be used to produce substantially the same results as those of the above embodiment. A multilayer neural network model may also be used as shown in FIG. 4.

Figure 4:
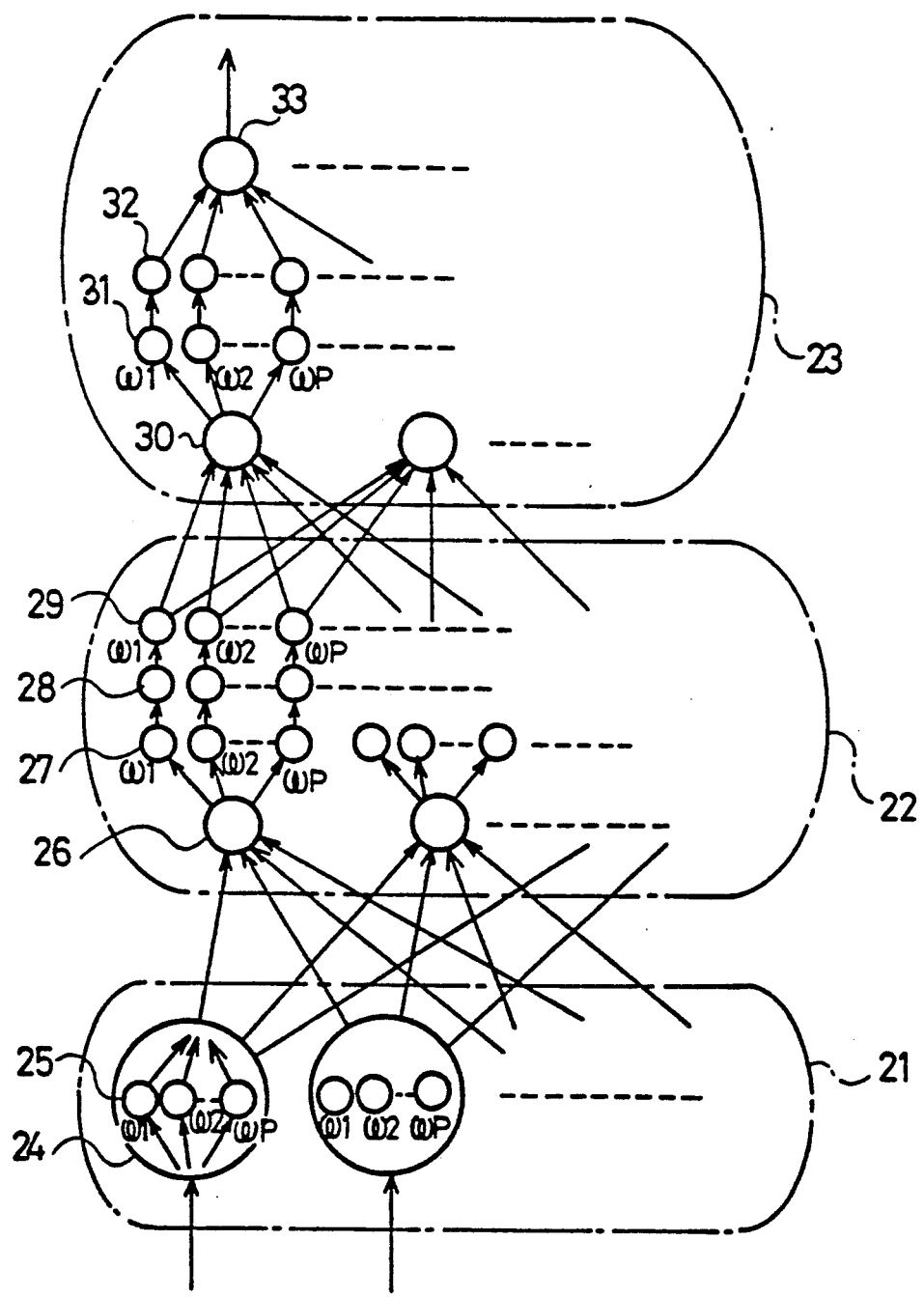
FIG. 4 is a schematic diagram of a neurocomputer according to still another embodiment of the invention.

In FIG. 4, this multilayer neural network includes an input layer 21, a hidden layer 22, and an output layer 23. Each input unit 24 is divided into P partial units 25, each of which is modulated with a frequency of $\omega_1, \ldots, \omega_p$. The input signal is binary; a logic 1 if there is an frequency modulated signal and a logic 0 if there is no such a signal. These signals are multiplexed in the input unit 24, and the output propagates to respective hidden units 26. The input section 26 of the hidden layer 22 adds signals from respective input units 24 to provide an output, the frequencies of which are separated by band-pass filters 27 having a central frequency of $\omega_1, \ldots, \omega_p$, followed by a threshold process in the comparator 28.

When the output of each comparator 28 is a 1, it is modulated with a frequency of $\omega_1, \ldots, \omega_p$ and transmitted to the output layer 23. The output frequencies of the output unit 30 are separated by band-pass filters 31. The peak value of each frequency is held by a peak hold circuit 32. The respective outputs are input into a comparator 33 to be subjected to a threshold process for outputting. If the number of modulation frequencies is P, the capacity of a network having N units is enhanced to an equivalent of $N \times P$ units.

Although the ordinary multilayer neural network model is discussed in the above embodiment, it is easy to expand it to a back propagation model which has a hierarchical structure. Although the light emitting element (neuron state vector) is modulated with a frequency multiplexed signal, the sensitivity of a light receiving element may be modulated with a frequency multiplexed signal to produce substantially the same results. This may be achieved by using a phototransistor, for example, as the light receiving element. Although the case of $\omega_k \gg \Omega_q$ is shown in the above embodiment, the case of $\Omega_q \gg \omega_k$ may work as well. The association characteristics of Hopfield's model is discussed in the above embodiment, but the invention may also be applied to an optimal value problem, such as a traveling salesman, to produce substantially the same results as those of the above embodiment.

Figure 5:
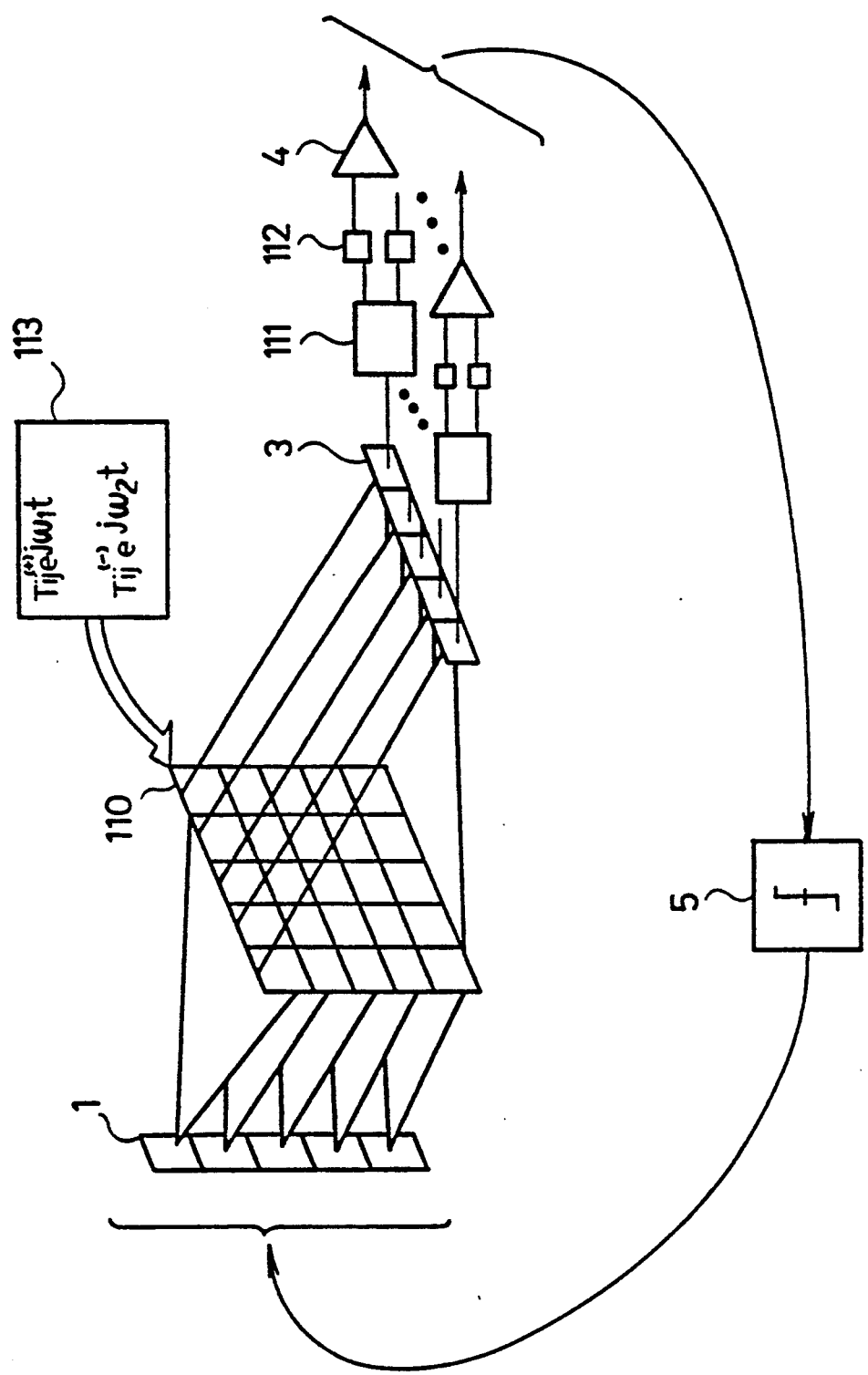
FIG. 5 is a schematic diagram of a neurocomputer according to yet another embodiment of the invention.

In FIG. 5, this neurocomputer includes an LED array 1, a light receiving array 3, a differential amplifier 4, a comparator 5, a spatial light modulator 110, a signal processor 111 made from a band-pass filter, a rectifier 112, and a driver 113 for the spatial light modulator 110.

Figure 10:
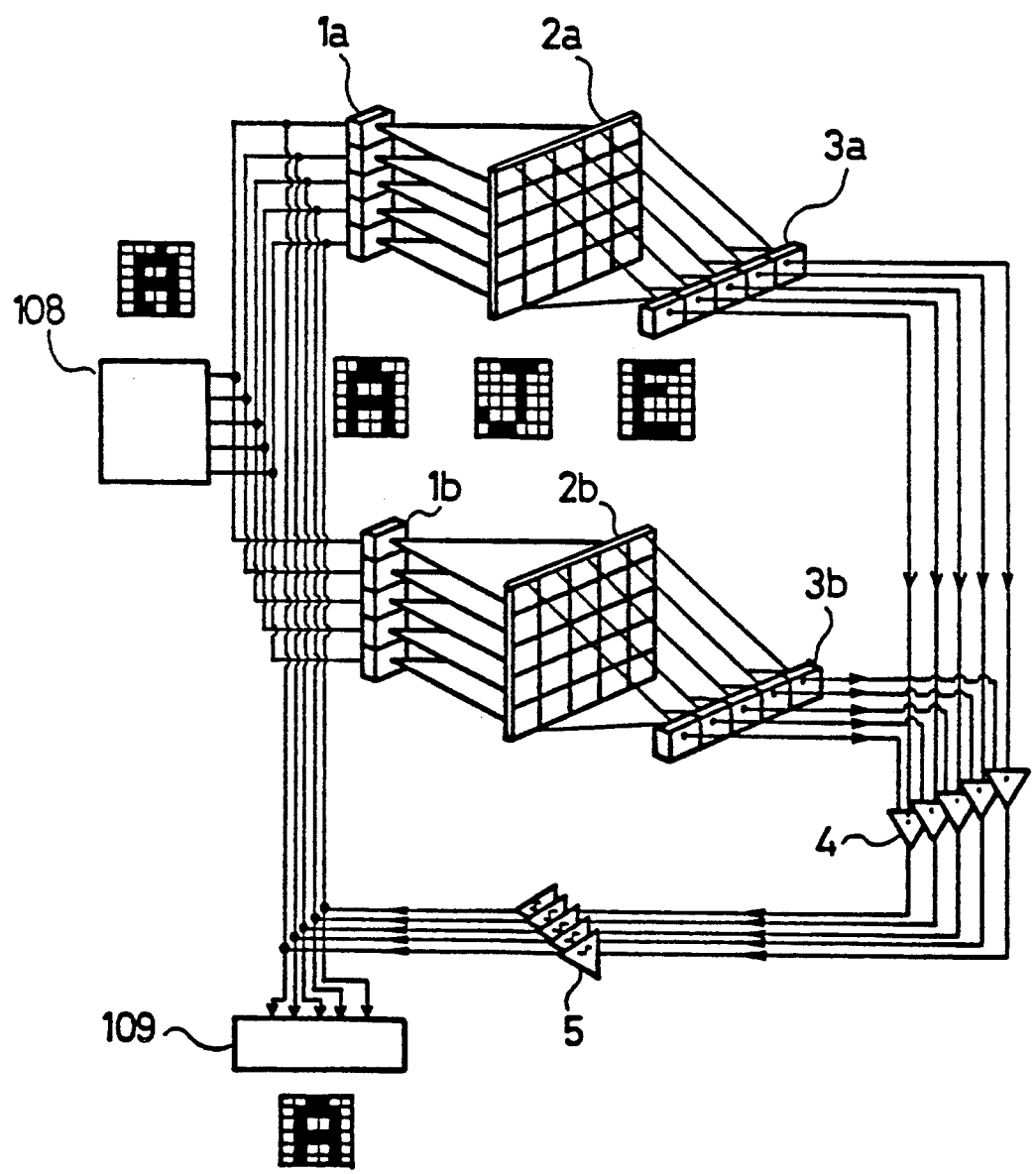

In operation, the working principle of this neurocomputer is the same as that of the conventional neurocomputer in FIG. 10. However, the optical mask 7 is replaced with the spatial light modulator 110 to be modulated with an external signal. Now, the spatial light modulator 110 is modulated simultaneously with angular frequencies $\omega_1$ and $\omega_2$ with respect to the positive value Tij(+) and the negative value Tij(−) of a matrix Tij.

$$T = [Tij] = [Tij^{(+)} \cos \omega_1 t + Tij^{(-)} \cos \omega_2 t] \quad (28)$$

If the j-th row of the spatial light modulator 110 is irradiated with the j-th LED 1 and the light ray from the i-th column of the spatial light modulator 110 is received by the i-th light received element 3, the resulting signal is $$\begin{aligned} U_i &= \sum_j T_{ij} V_j \\ &= \sum_j (T_{ij}^{(+)} V_j \cos \omega_1 t + T_{ij}^{(-)} V_j \cos \omega_2 t) \end{aligned} \quad (29)$$

This signal is passed through the band-pass filter 111 to separate angular frequencies $\omega_1$ and $\omega_2$, followed by rectification by the rectifier 112 to give $$U_i^{(+)} = \sum_j T_{ij}^{(+)} V_j \quad (30)$$

$$U_i^{(-)} = \sum_j T_{ij}^{(-)} V_j$$

A subtraction between these signals in the differential amplifier 4 gives $$Ui = Ui(+) - Ui(-) \quad (31)$$

This signal is subjected to a threshold process in the comparator 5, and the result is fed back to the LED array 1.

Although the spatial light modulator is driven with a frequency multiplexed signal in the above embodiment, it may be driven with signals which are equal in frequency but different in phase such as Tij(+) cos ωt and Tij(−) sin ωt for the positive and negative values of Tij. In this case, the positive and negative values of Tij are discriminated by phase (phase modulation method). Also, time division multiplexing may be employed as shown in FIG. 6.

Figure 6:
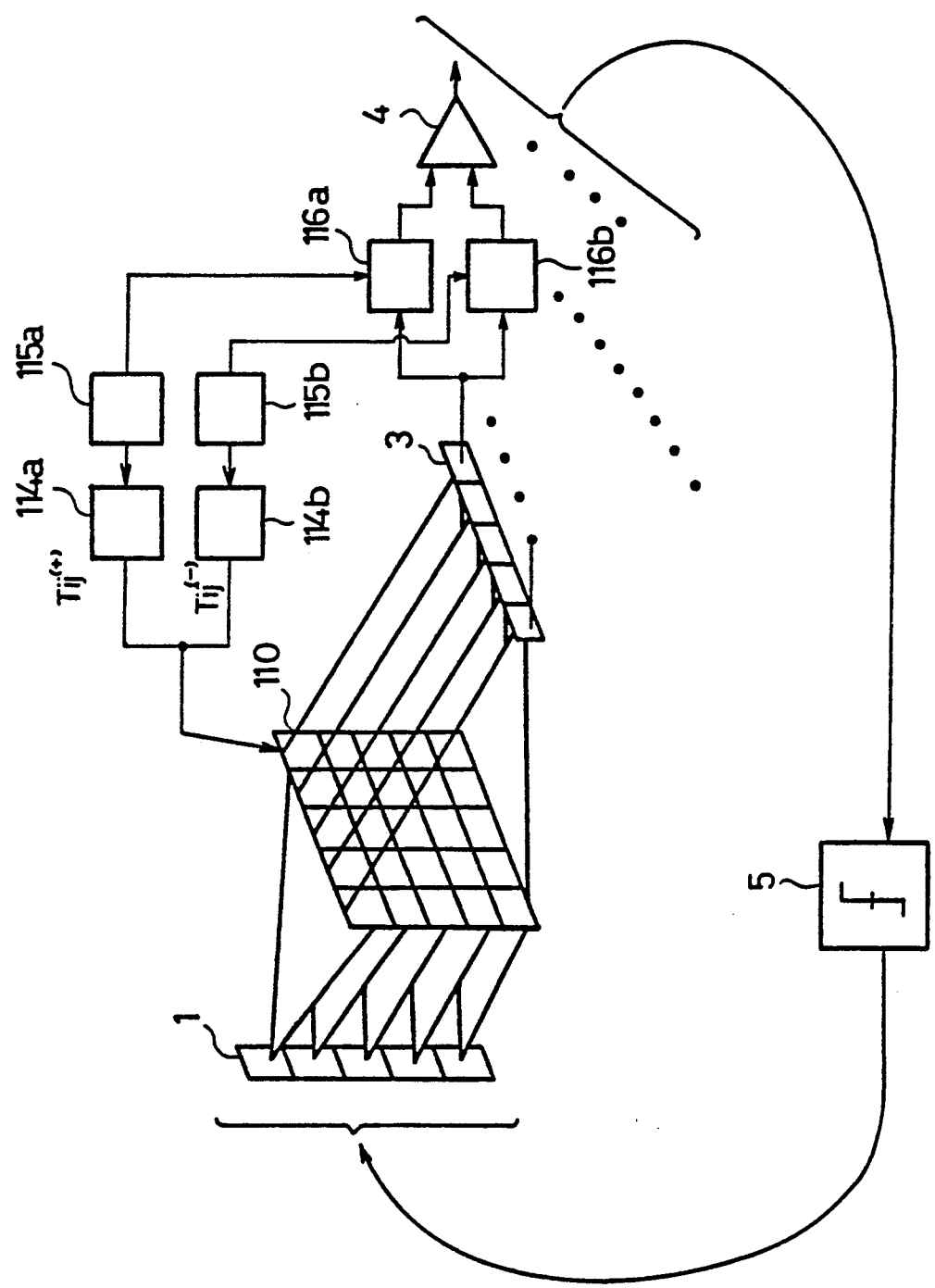
FIG. 6 is a schematic diagram of a neurocomputer according to still another embodiment of the invention.

In FIG. 6, this neurocomputer includes a LED array 1, a light receiving array 3, a differential amplifier 4, a comparator 5, a spatial light modulator 110, a pair of drivers 114a and 114b for the spatial light modulator 110, a pair of pulse generators 115a and 115b, and a pair of sample hold amplifiers 116a and 116b.

The spatial light modulator 110 are driven with alternating pulses Tij(+) and Tij(−) from the pulse generators 115a and 115b via the drivers 114a and 114b. The positive value Tij(+) and the negative value Tij(−) of a Tij matrix are separated by sampling and holding the output of the light receiving element 3 in synchronism with the driving pulse for the spatial light modulator 110. The remaining operation is the same as that of the embodiment in FIG. 5.

Figure 7:
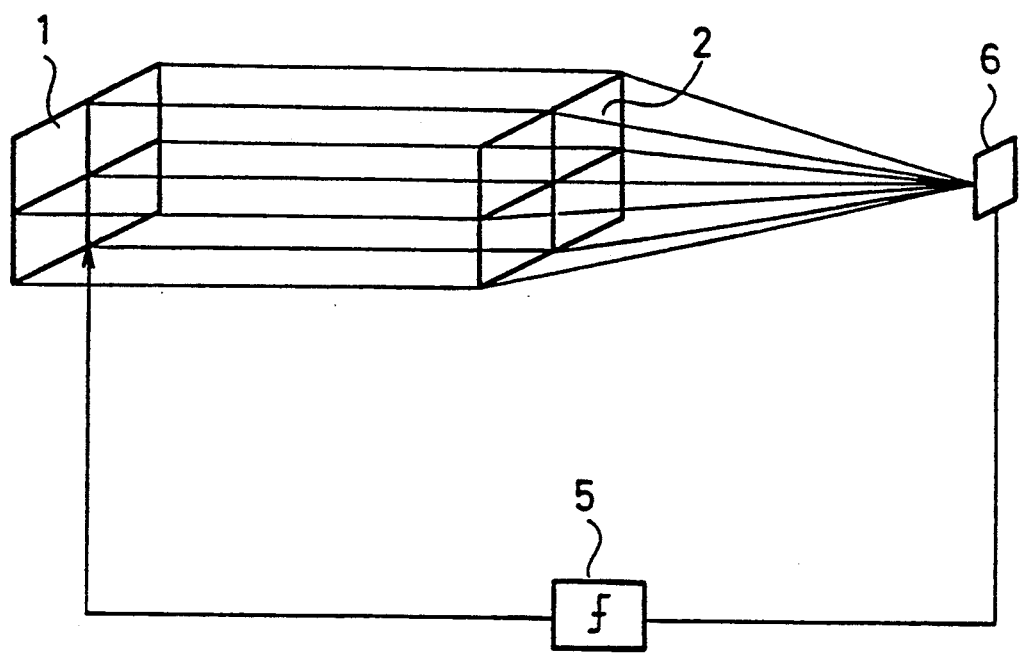
FIG. 7 is a schematic diagram of a neurocomputer according to yet another embodiment of the invention.

In FIG. 7, this neurocomputer includes a state vector transmitter 1 consisting of a matrix of elements, such as LEDs, which generates a signal corresponding to the neuron state vector and a correlation matrix unit 2 for dividing the correlation matrix Tij into a number of submatrices and outputting them in time sequence while modulating the signal of the state vector transmitter 1 in the submatrix state to generate a group of product signals between the neuron state vector and the submatrix. In this embodiment, the correlation matrix 2 is a spatial light modulator so that it is possible to change the transmittance of each position of the matrix. Such a spatial light modulator is described in *Applied Optics*, 1986, Vol. 25, No. 9, pp. 1380-1382.

A receiving element 6, such as a photodiode, receives a group of product signals from the correlation matrix 2 to provide the sum of these signals, or receives one component of the neuron membrane potential vector in time sequence. A comparator 5 is provided to perform a threshold process.

In operation, the vector component (Vi) of a unipolar neuron with N neurons is subjected to a transformation ($\tau'$) to provide a matrix Xkl of k rows and L columns.

$$X_{kl} = \tau'[V_i] = \begin{pmatrix} V_1, V_2, \ldots, V_K \\ V_{K+1}, V_{K+2}, \ldots, V_{2K} \\ \text{------------------} \\ V_{N-K+1}, \text{------}, V_N \end{pmatrix} \quad (32)$$

$(N = KL)$

The correlation matrix Tij performs transformation $\tau'$ for each component i of every row to give N submatrices $Y'_{Kl}{}^{(pq)}$ each consisting of K rows and L columns.

$$Y_{kl}^{(pq)} = \tau'[T_{ij}] = \begin{pmatrix} T_{i1}, T_{i2}, \ldots, T_{iK} \\ T_{iK+1}, \ldots, T_{i2K} \\ \text{------------------} \\ T_{i,N-K+1}, \ldots, T_{iN} \end{pmatrix} \quad (33)$$

$(pq = 11, 12, \ldots, 1L, 21, \ldots, KL)$

The product (membrane potential) Z of the correlation matrix T and the neuron state vector v is given by $$Z_{pq} = \sum_{kl=11}^{KL} Y_{kl}^{(pq)} X_{kl} \quad (34)$$

In the embodiment of FIG. 7, N=4, K=L=2.

Now, the submatrix $Y^{(kl)}$ is displayed on the matrix plane 2 and $x_{pq}$ is displayed on the LED array 1 at a time t=11. The output of the light receiving element 6 represents the result of matrix operation.

This value is subjected to a threshold process in the comparator 5 to provide an input to $x_{pq}$ of the LED array 1.

$$x_{11} = \theta(Z_{11}) \quad (35)$$

At the next time t=12, the submatrix $Y'_{kl}{}^{(12)}$ and the updated $x_{pq}$ are displayed to perform similar matrix operation $$\sum_{kl=12}^{KL} Y_{kl}^{(12)} X_{kl}$$

and threshold process, and the result is fed back to $x_{pq}$ of the LED array 1.

The above process is repeated (asynchronously) up to t=KL. The same results as those of simultaneous display of the correlation matrix Tij is achieved by repeating the above process between t=11 and t=KL.

Although the neuron state $x_{pq}$ is updated (asynchronously) at every t=pq in the above embodiment, the output $x_{pq}$ after the threshold process between t=11 and t=KL may be updated (synchronously) by using a memory or the like. Although all of the neuron state vectors are displayed at once to perform operation, it is possible to divide the neuron state vector into a number of units in order to increase the number of neurons (N) and the correlation submatrix into the corresponding units for performing vector matrix operation and then summation of the results by the light receiving element or adder.

The LED array 1 for representing the neuron state vector in the above embodiment may be replaced with a spatial light modulator. Although the invention is discussed with respect to the association characteristics in the above embodiment, it may be applied to an optimal value problem or the introduction of a learning function to produce substantially the same results as those of the above embodiment. The above embodiment is based on Hopfield's neural network model but may be based on another neural network model, such as the back propagation model, to produce substantially the same results. Although the above embodiment is implemented by optical technology but may be implemented by using electronic technology, such as LSI technology, to produce substantially the same results.

As has been described above, in accordance with one aspect of the invention, it is possible to increase the number of imaginary neurons (N) without increasing the system size to thereby increase the number of pieces of stored information (M) by means of a control unit which performs dividing the correlation matrix into a number of submatrices, outputting the submatrices in time sequence while generating partial vectors of the state vector in time sequence, and operation on each submatrix and each partial vector to perform a product operation on the correlation matrix and the neuron state vector.

In accordance with another aspect of the invention it is possible to increase the number of imaginary neurons (N) without increasing the system size to thereby increase the number of pieces of stored information (M) by means of a control unit which performs modulation of the submatrices and the partial vectors with different frequencies for frequency multiplexing, and product operation on the multiplexed state vector and the correlation matrix, separating the frequencies to provide a product of the entire state vector and the correlation matrix.

In accordance with still another aspect of the invention it is possible to provide a simple neurocomputer with a single optical system, which is easy to make on large scale, by providing an array of light emitting elements each of which is turned on and off according to the neuron state vector, a spatial light modulator which is driven with different frequencies or phases for respective positive and negative values of stored information or by time division multiplexing for the positive and negative values to provide a correlation matrix and modulates the light from the light emitting array and transmits the optical product signal of the correlation matrix and the neuron state vector, a light receiving array for receiving the transmitted light from the spatial light modulator to provide the sum of the product signals, a signal processor for discriminating the output of the light receiving array to provide signals corresponding to the positive and negative values, and a differential amplifier for providing a difference between the signals from the signal processor, each being equivalent to the positive and negative values, and a comparator for performing a threshold process on the difference and feeding it back to the light emitting array.

In accordance with a yet another aspect of the invention it is possible to process a large amount of information with a small system without difficulty by providing a state vector transmitter which is consisting of a matrix of elements each generating a signal corresponding to the neuron state vector, a correlation matrix unit for dividing the correlation matrix into a number of submatrices and outputting them in time sequence while modulating a signal from the state vector transmitter with the submatrix to provide a group of production signals of the neuron state vector and the submatrix, and a receiving element for receiving the production signal group to provide the sum of these signals for providing production operations in time sequence.

Since no hologram is required when the neurocomputer of the invention is made by optical technology, it is easy to not only make such a neurocomputer but also align the optics.

What is claimed is:

1. An optical neural network for selecting a vector most similar to an input vector from stored vector information by performing a product operation of said input vector and a correlation matrix representing said vector information, said optical neural network comprising:
   means for generating an optical signal,
   means for modulating said optical signal,
   means for receiving said modulated optical signal, and
   a control unit having
      means for dividing said input vector into a plurality of partial vectors and said correlation matrix into a plurality of two dimensional submatrices, including means for controlling at least one of said means for generating an optical signal, said means for modulating, and said means for receiving, to multiply said partial vectors and said submatrices in time sequence thereby providing a product of said correlation matrix and said input vector.

2. An optical neural network as set forth in claim 1, wherein
   said means for generating an optical signal produces a signal indicative of said input vector;
   said means for modulating said optical signal modulates said signal with a function of said stored vector information to produce a modulated optical signal indicative of the partial product of said input vector and said stored vector information;
   said means for receiving receives said modulated optical signal from said means for modulating, and provides an electrical signal corresponding to said modulated optical signal, and
   said optical neural network further comprises:
   means for accumulating and receiving an output of said means for receiving and for providing an output signal indicative of the partial product of said input vector and said stored vector information;
   a threshold device having means for comparing said output of said accumulator with a threshold value indicative of the range of acceptable outputs, and means for modifying the optical signal generated by said means for generating an optical signal on the basis of said comparison; and
   wherein said control unit further comprises means for controlling said means for accumulating.

3. An optical neural network for selecting a vector most similar to an input vector from stored vector information by performing a product operation of said input vector and a correlation matrix representing said stored vector information, said optical neural network comprising:
   a plurality of light emitting elements for generating an optical signal,
   first means for modulating said optical signal,
   means for receiving said modulated optical signal, and
   a control unit comprising
      means for dividing said input vector into a plurality of partial vectors and said stored vector information into a plurality of two dimensional submatrices, and for providing a plurality of frequencies, each frequency corresponding respectively to each said partial vector, and a plurality of pairs of frequencies, each said pair corresponding respectively to each of said submatrices,
      second means for modulating each of said light emitting elements respectively with a function of said provided frequencies and the elements of said partial vectors corresponding to said light emitting element,
      third means for modulating said first means for modulating with functions of said provided pairs of frequencies and said submatrices to provide a modulated optical signal indicative of modulated partial products of said input vector and said stored vector information, and
      means for demodulating said modulated partial products to retrieve a signal indicative of the product of said input vector and said correlation matrix.

4. An optical neural network as set forth in claim 3, wherein
   said light emitting elements generate an optical signal indicative of said input vector;
   said first means for modulating modulates said optical signal with a function of said stored vector information;
   said means for receiving said modulated optical signal provides an electrical signal corresponding to said modulated optical signal;
   said optical neural network further comprising means for accumulating said output of said means for demodulating to calculate and output the product of said input vector and said stored vector information; and
   means for comparing the output of said accumulating means with a threshold value indicative of the range of acceptable outputs, and having means for modifying the input vector indicated by said means for generating an optical signal on the basis of said comparison.

5. An optical neural network as set forth in claim 3, wherein said neural network is a multilayer neural network consisting of an input layer, a hidden layer, and an output layer.

6. An optical neural network for performing a product and sum operation on a neuron state vector and a correlation matrix, which comprises:
   an array of light emitting elements for generating an optical signal indicative of said neuron state vector;
   a spatial light modulator for modulating said optical signal generated by said array of light emitting elements to produce a product optical signal indicative of the product of said neuron state vector and said correlation matrix;

means for modulating said spatial light modulator with different frequencies said frequencies indicative of positive and negative values of stored information;

an array of light receiving elements for receiving said product optical signal from said spatial light modulator and for providing an output signal corresponding to said product optical signal;

a signal processor for demodulating said output signal of said array of light receiving elements to retrieve and output signals equivalent to said positive and negative values;

a differential amplifier for calculating the difference between said signals equivalent to said positive and negative values; and a comparator for comparing said difference from said differential amplifier to a threshold value indicative of a range of desired output values and means for modifying said optical signal generated by said array of light emitting elements on the basis of said comparison.

7. An optical neural network as set forth in claim 6, wherein said means for modulating comprises a driver for modulating and driving said spatial light modulator simultaneously with angular frequencies $\omega_1$ and $\omega_2$ respectively indicative of positive and negative values.

8. An optical neural network as set forth in claim 7, wherein said signal processor comprises a band-pass filter for separating said output signal of said array of light receiving elements into components of angular frequencies $\omega_1$ and $\omega_2$ to provide signals corresponding to said positive and negative values.

9. An optical neural network as set forth in claim 15, wherein said means for modulating comprises:

a pulse generator which generates pulses for representing positive and negative values; and a driver responsive to said pulses for driving by time division multiplexing said spatial light modulator.

10. An optical neural network as set forth in claim 9, wherein said signal processor comprises a sample hold amplifier for sampling and holding said output signal of said array of light receiving elements for each positive and negative value in synchronism with said pulse and for providing signals corresponding to said positive and negative values.

11. A method for selecting from stored vector information a vector most similar to an input vector, said stored vector information forming a correlation matrix, said method comprising the steps of:

(a) dividing said input vector into P partial vectors, each partial vector Vp (p=1, 2, . . . , P) having a length associated therewith, (b) dividing said correlation matrix into S two-dimensional submatrices, forming Q columns of P submatrices, wherein each said submatrix Tp (p=1, 2, . . . , P) in each said column has a number of rows associated therewith, wherein for all p=1 2, . . . , P, said number of rows associated with each said submatrix Tp and said length associated with each said partial vector Vp are equal, (c) selecting one of said partial vectors and a multiplicatively corresponding submatrix, (d) generating an optical signal indicative of said selected partial vector by illuminating an array of light emitting elements, (e) modulating said optical signal with a matrix mask on the basis of said corresponding submatrix to provide a product optical signal indicative of the product of said selected partial vector and said corresponding submatrix, (f) receiving said product optical signal by light receiving elements, and (g) adding said product indicated by said optical signal to any previously calculated partial products.

12. A method for an optical neural network having a plurality of light emitting elements, light modulating means and light receiving means, for selecting from stored vector information a vector most similar to an input vector, said stored vector information forming a correlation matrix, said method comprising the steps of:

(a) dividing said input vector into P partial vectors, each partial vector Vp (p=1, 2, . . . , P) having a number of elements, said number less than a number k, (b) dividing said stored vector information into S two dimensional submatrices, thus forming Q columns of P submatrices, each submatrix Tpq (p=1, 2, . . . P; l=1, 2, . . . , Q) having a number of rows r associated therewith, whereby for all p=1, 2, . . . , P, said number of rows associated with each submatrix Tpq and said number of elements of each partial vector Vp are equal, (c) providing P frequencies $\omega_p$ respectively corresponding to each partial vector Vp, (d) providing P frequencies $\Omega p$, and Q frequencies $\Omega q$, respectively corresponding to each submatrix Tpq, (e) modulating each said light emitting element with a respective modulation function, said modulation function for a light emitting element calculated on the basis of the corresponding elements of said partial vectors and said frequencies $\omega_p$ corresponding to said partial vectors, (g) modulating said optical signal with a light modulating means with a function of said submatrices and said corresponding frequencies $\Omega p$ and $\Omega q$, (h) receiving said modulated optical signal by light receiving elements to output a modulated product signal, (i) demodulating said modulated product signal to retrieve and output a product signal indicative of a partial product of said input vector and said stored vector information.

13. An optical neural network for performing a product and sum operation on a neuron state vector and a correlation matrix, which comprises:

an array of light emitting elements for generating an optical signal indicative of said neuron state vector;

a spatial light modulator for modulating said optical signal generated by said array of light emitting elements to produce a product optical signal indicative of the product of said neuron state vector and said correlation matrix;

means for modulating said spatial light modulator with time division multiplexing for indicating positive and negative values of stored information;

an array of light receiving elements for receiving said product optical signal from said spatial light modulator and for providing an output signal corresponding to said product optical signal;

a signal processor for demodulating said output signal of said array of light receiving elements to retrieve and output signals equivalent to said positive and negative values;

a differential amplifier for calculating the difference between said signals equivalent to said positive and negative values; and a comparator for comparing said difference from said differential amplifier to a threshold value indicative of a range of desired output values and means for modifying said optical signal generated by said array of light emitting elements on the basis of said comparison.

14. An optical neural network for performing a product and sum operation on a neuron state vector and a correlation matrix, which comprises:

an array of light emitting elements for generating an optical signal indicative of said neuron state vector;

a spatial light modulator for modulating said optical signal generated by said array of light emitting elements to produce a product optical signal indicative of the product of said neuron state vector and said correlation matrix;

means for modulating said spatial light modulator with different phases, said phases indicative of positive and negative values of stored information;

an array of light receiving elements for receiving said product optical signal from said spatial light modulator and for providing an output signal corresponding to said product optical signal;

a signal processor for demodulating said output signal of said array of light receiving elements to retrieve and output signals equivalent to said positive and negative values;

a differential amplifier for calculating the difference between said signals equivalent to said positive and negative values; and a comparator for comparing said difference from said differential amplifier to a threshold value indicative of a range of desired output values and means for modifying said optical signal generated by said array of light emitting elements on the basis of said comparison.

* * * * *